(12) United States Patent
O'Brien et al.

(10) Patent No.: US 7,939,463 B1
(45) Date of Patent: *May 10, 2011

(54) PREPARATION OF IRON OXIDES

(75) Inventors: Robert J. O'Brien, Louisville, KY (US); Samantha E. Sargent, Borden, IN (US); Guido Petrini, Galliate (NO) (IT); Esterino Conca, Novara (IT)

(73) Assignee: Sud-Chemie Inc., Louisville, KY (US)

( * ) Notice: Subject to any disclaimer, the term of this patent is extended or adjusted under 35 U.S.C. 154(b) by 1098 days.

This patent is subject to a terminal disclaimer.

(21) Appl. No.: 11/668,168

(22) Filed: Jan. 29, 2007

Related U.S. Application Data

(63) Continuation-in-part of application No. PCT/US02/15310, filed on May 15, 2002, and a continuation-in-part of application No. 10/343,935, filed on May 29, 2003, now Pat. No. 7,199,077, and a continuation-in-part of application No. 11/254,463, filed on Oct. 20, 2005, now Pat. No. 7,566,680.

(51) Int. Cl.
*B01J 23/70* (2006.01)
*B01J 23/74* (2006.01)
*B01J 31/00* (2006.01)
*B01J 37/00* (2006.01)
*C08F 4/02* (2006.01)
*C08F 4/60* (2006.01)
*C01G 49/02* (2006.01)

(52) U.S. Cl. ........ 502/338; 502/104; 502/105; 502/110; 502/113; 423/632; 423/633

(58) Field of Classification Search .................. 502/104, 502/105, 110, 113, 326, 338; 423/632, 633
See application file for complete search history.

(56) References Cited

U.S. PATENT DOCUMENTS

| | | | | |
|---|---|---|---|---|
| 3,657,155 A | * | 4/1972 | Yoshino et al. ............... | 502/249 |
| 3,748,119 A | * | 7/1973 | Hwang et al. .................. | 75/349 |
| 3,892,897 A | * | 7/1975 | Rittler ............................ | 502/309 |
| 3,965,046 A | * | 6/1976 | Deffeyes ........................ | 502/337 |
| 4,343,724 A | * | 8/1982 | Antos ............................ | 502/231 |
| 4,414,133 A | * | 11/1983 | Otake et al. ................... | 502/179 |
| 4,478,954 A | * | 10/1984 | Connolly et al. ............. | 518/700 |
| 4,499,204 A | * | 2/1985 | Vanderspurt et al. ......... | 502/301 |
| 4,568,662 A | * | 2/1986 | Bialy et al. ..................... | 502/257 |
| 4,598,062 A | * | 7/1986 | Schneider et al. ............ | 502/306 |
| 4,666,882 A | * | 5/1987 | Okazaki et al. ............... | 502/338 |
| 4,677,084 A | * | 6/1987 | Bergna ............................ | 502/8 |
| 4,861,745 A | * | 8/1989 | Huang et al. .................. | 502/314 |
| 5,059,573 A | * | 10/1991 | Sasaki et al. ................... | 502/205 |
| 5,536,693 A | * | 7/1996 | Lemanski et al. ............ | 502/300 |
| 5,580,839 A | * | 12/1996 | Huffman et al. .............. | 502/338 |
| 5,665,667 A | * | 9/1997 | Lemanski et al. ............ | 502/300 |
| 5,783,726 A | * | 7/1998 | Lemanski et al. ............ | 560/261 |
| 5,863,856 A | * | 1/1999 | Mauldin ......................... | 502/325 |
| 6,013,599 A | * | 1/2000 | Manson ......................... | 502/340 |
| 6,100,215 A | * | 8/2000 | Sasaki et al. .................. | 502/201 |
| 6,183,658 B1 | * | 2/2001 | Lesniak et al. ............. | 252/62.56 |
| 6,265,451 B1 | * | 7/2001 | Zhou et al. ..................... | 518/700 |
| 6,790,274 B2 | * | 9/2004 | Conca et al. ................... | 106/456 |
| 7,199,077 B2 | * | 4/2007 | Hu et al. ......................... | 502/325 |
| 7,566,680 B2 | | 7/2009 | Petrini et al. | |
| 2003/0175204 A1 | | 9/2003 | Conca et al. | |
| 2004/0009871 A1 | * | 1/2004 | Hu et al. ......................... | 502/338 |
| 2004/0202606 A1 | * | 10/2004 | Conca et al. ................... | 423/633 |

FOREIGN PATENT DOCUMENTS

| | | |
|---|---|---|
| GB | 287702 | 3/1928 |
| GB | 1226876 | 3/1971 |

OTHER PUBLICATIONS

Newsome, David. "The Water-Gas Shift Reaction." Catal. Rev. Sci. Eng. 21(2), 275-318 (1980).

* cited by examiner

*Primary Examiner* — Cam N Nguyen
(74) *Attorney, Agent, or Firm* — Scott R. Cox

(57) ABSTRACT

A process for producing a high surface area iron material, comprising predominantly low crystalline iron oxides, starting with a low surface area iron metal is disclosed. The iron material of the present invention has a surface area of at least about 200 m$^2$/g, and is prepared via a method which comprises reacting a low surface area iron metal with oxygen and an organic acid. The high surface area iron material formed via this method is essentially free of contaminants.

30 Claims, No Drawings

PREPARATION OF IRON OXIDES

CROSS REFERENCE TO RELATED APPLICATIONS

This application is a continuation in part application of PCT Patent Application Serial Number PCT/US02/15310 filed on May 15, 2002, now nationalized; U.S. patent application Ser. No. 10/343,935 filed on May 29, 2003, now U.S. Pat. No. 7,199,077; and U.S. patent application Ser. No. 11/254,463 filed on Oct. 20, 2005, now U.S. Pat. No. 7,566,680; these applications being incorporated herein in their entirety by reference.

BACKGROUND

The present invention is for a method for producing a high surface area iron material, comprising predominantly amorphous or poorly crystalline iron oxides, starting with a low surface area iron metal. The iron material of the present invention has a surface area of at least about 200 m$^2$/g, and is prepared via a method which comprises reacting a low surface area iron metal with oxygen and an organic acid. The high surface area iron material formed via this method is essentially free of contaminants.

Iron-based catalysts are known in the art for use in a variety of chemical reactions. For example, in water gas shift reactions it is common practice to employ chromium-promoted iron catalysts in a high temperature first stage (referred to as a high temperature shift or HTS reaction) to effect carbon monoxide conversion at temperatures above about 350° C. and to reduce the CO content to about 3%-4% (see, for example, D. S. Newsom, Catal. Rev., 21, p. 275 (1980)). A typical composition of high temperature shift (HTS) catalyst comprises from about 60 wt % to about 95 wt % $Fe_2O_3$, from about 0 wt % to about 20 wt % $Cr_2O_3$, from about 0 wt % to about 10 wt % of CuO and from about 0 wt % to about 10 wt % other active components such as $ZrO_2$, $TiO_2$, $Co_3O_4$, $Al_2O_3$, $SiO_2$ and/or $CeO_2$.

Since the 1950's iron-based Fischer-Tropsch catalysts have been successfully used in fixed-bed, fluidized-bed and slurry phase reactors, and there have been several methods used for the preparation of iron-based Fischer-Tropsch catalysts. The earliest catalysts, prepared by Fischer, were iron turnings treated with alkali. At high pressure, the liquid product was rich in oxygenated compounds, and at lower pressures hydrocarbons were produced. However, the iron-based catalysts prepared by this method deactivated rapidly.

Various types of iron precursors are known for use in the production of catalysts. For example, iron-based Fischer-Tropsch catalysts often have a catalyst precursor usually composed of high surface area corundum phase iron oxide ($\alpha$-$Fe_2O_3$ or hematite). Microcrystalline phases of iron oxides such as ferrihydrite, goethite and lepidocrocite, distinct minerals in the family of oxides, hydroxides and oxyhydroxides of iron, are common precursors to some of these other iron oxides such as hematite and magnetite, and hence, have value as starting materials for catalyst production. Further, ferrihydrite has been used directly as an absorbent and a catalyst. Because of its utility as a high surface area precursor for iron-based catalysts, it would be advantageous to have a process for preparing ferrihydrite that does not require numerous washing steps, but that resulted in a ferrihydrite contained few to no contaminants when prepared.

SUMMARY OF THE PRESENT INVENTION

A high surface area iron material comprising predominantly low crystalline iron oxides is prepared from a low surface area iron metal. The iron oxides prepared by the process of the present invention have a surface area of at least about 200 m$^2$/g, and are essentially free of contaminants. The process for preparation of the low crystalline iron oxides comprises digesting iron metal with an organic acid under an inert atmosphere, followed by an oxidation and precipitation step with oxygen. In a preferred embodiment, the reaction temperature is maintained at about 30° C. in the reaction tank throughout the iron digestion stage. The reaction solution is well-agitated, and optionally, a defoaming agent may be added. The resulting iron oxide slurry is then filtered, re-slurried and refiltered. The resultant filter cake is dried to form the high surface area iron oxide with low crystallinity. Because the process starts with iron metal, the level of potential contaminants, such as sulfur and chlorine, can be kept to a minimum by starting with clean metal. Further, by starting with iron metal, there are no residual materials which need to be removed by washing the iron oxide filtrate.

DETAILED DESCRIPTION OF THE PREFERRED EMBODIMENTS

The high surface area iron material of the present invention is intended for use in any iron-based catalyst requiring a high surface area. The process for preparing the iron material of the present invention results in the production of predominantly low crystalline iron oxyhydroxides such as ferrihydrite, goethite and lepidocrocite, and the resulting iron material has a surface area of at least about 200 m$^2$/g. Further, the process by which the iron material is prepared is novel and produces an iron material that is essentially free of contaminants, and which has a relatively narrow particle size distribution range, and a high surface area, and which can be produced more efficiently than iron oxide materials of the prior art.

Broadly presented, the process of the present invention for preparing the low crystalline iron oxides includes directly treating iron metal with an organic acid and oxygen while vigorously agitating the mixture to form a slurry consisting of iron oxyhydroxide, iron hydroxide, iron oxide hydrate, or other amorphous or poorly ordered iron phases, then filtering the slurry to produce a filter cake, then reslurrying the filter cake and refiltering the slurry, and then drying the filter cake. More specifically, to prepare the low crystalline iron oxides through the process of the present invention, water is added to a temperature-controlled reaction vessel fitted with a condenser and chiller, and having a means for mixing or similarly agitating the contents of the vessel. The reaction vessel is held at a temperature of from about 0° C. to about 50° C., and preferably at a temperature of from about 0° C. to about 40° C., and more preferably at a temperature of from about 20° C. to about 35° C., and is fitted with a condenser held at from about 0° C. to about 5° C. Iron metal is added to the reaction vessel and the vessel is purged with an inert gas. As the iron and water are agitated and while maintaining the inert atmosphere, an organic acid is added to the vessel. The acid/iron combination is mixed for a predetermined period of time under the inert atmosphere, oxygen is added to the reaction vessel with vigorous agitation. After a predetermined amount of oxygen has been added to the reaction vessel, the oxygen flow is stopped and the reactor temperature is raised and the slurry is mixed until a dark red/red-brown gel forms and precipitates. The precipitate is filtered, and then the slurry filter cake is added to water and reslurried, and the slurry is filtered. The filter cake is then dried to produce the high surface area iron material. Alternatively, a defoaming agent may be added to the acid I iron combination after a predetermined period of time but prior to initiation of the oxygen flow.

Oxygen is then added until a red or red-orange precipitate forms. The precipitate is filtered and dried or, optionally, the slurry filter cake is added to water, reslurried, and then the slurry is filtered. The filter cake is then dried to produce the high surface area iron material.

The iron metal may be a powder, granule, sphere, chip, shard, needle or other form of iron metal, and has a surface area of less than about 25 m$^2$/g, and is essentially free of contaminants. As described herein, the iron metal has an average diameter of from about 1 μm to about 500 μm. However, iron metal with a larger average diameter may be used, but the reaction time may need to be altered (increased) to ensure that the iron metal has adequate time to react. In one embodiment, the iron metal is in micro-spheroidal form with an average diameter of from about 40 μm to about 150 μm. Further, the iron metal should be essentially contaminant-free, although traces of carbon, manganese, nickel, copper, silicon and combinations thereof, may be present. (As used herein, "traces" is defined as less than about 1.5 wt % for all the elements combined.)

The organic acid is preferably a carboxylic acid having at least one carboxylic acid group with a pK$_a$ at ambient temperature of from about 0.5 to about 6. (As used herein, the term "ambient" refers to average room temperature or to a temperature of from about 18° C. to about 22° C.) For example, formic acid, acetic acid, glycolic acid, oxalic acid, pyruvic acid, malonic acid and propionic acid may be used in the reaction. In a preferred embodiment, the organic acid is glacial acetic acid. The acid to iron ratio may vary. In the present invention, the acid to iron mole ratio is preferably between about 0.1 acid per 1 iron to about 2.5 acid per 1 iron.

The inert gas can be any non-reactive material known in the art, such as nitrogen gas or argon gas. Normally, nitrogen gas is used commercially because of its relatively low cost.

The defoaming agent can be any organic defoaming agents, such as alcohols, esters, ethers, glycols and a combination thereof. In a preferred embodiment, the defoamer is silicone-free, mineral oil-free and petroleum-free.

The oxidizing agent is preferably oxygen which is forced through the solution via the hollow shaft of the mixer such that the oxygen flows through the shaft and is discharged underneath the impeller, or via a stainless steel sparger mounted within a mix tank, or via a dip tube extending through the reaction slurry to a discharge point below the impeller, or via any of a variety of other means as are known in the art may be used to bubble oxygen through the acid/iron combination. The oxygen must be well dispersed throughout the entire volume of the solution in order to produce the desired high surface area iron material. In a preferred embodiment, the mixer is equipped with multiple impellers for gas dispersion and solid mixing, including a radial flow gas dispersion impeller and an axial flow solid mixing impeller.

In an exemplary embodiment, the oxidizing agent is not added to the acid/iron solution until essentially all the free iron is consumed and an iron material slurry is formed. (As used herein, "essentially all" the free iron is defined as greater than about 95% of the iron free iron added to the reactor.) During this iron digestion stage, the reaction temperature is held at about 30° C. and the acid/iron solution is maintained under an inert gas atmosphere. The resulting solution/slurry is believed to be comprised of ferrous carboxylate and unreacted iron. Total iron consumption time, or iron digestion time, can range from about 1 hour to about 24 hours, or longer depending on the iron source. After the iron digestion period, oxygen or other oxidizing agent is added to the reactor. As the oxygen reacts with the iron material in the iron slurry, the slurry color changes from gray to brown or red-brown. The oxygen flow is maintained for about 20 hours to about 30 hours, until the solution has a dark red color or deep red-brown color. Typically, the color change will be noticeable from about 45 minutes to about 6 hours after the oxygen flow is started. After the solution reaches a steady dark red color, the oxygen flow is stopped and the jacketed reactor temperature is increased from a temperature of about 30° C. to a temperature of about 55° C. to about 70° C. and the solution is agitated at this elevated temperature for a period of from about 45 minutes to about 6 hours until a red-brown gel precipitate forms. Optionally, unreacted iron may be removed magnetically. The gel precipitate can then be filtered, washed, and promoted by methods known in the art.

If a defoamer is used to effectuate the production of iron oxides with low crystallinity, the defoamer is added during the iron digestion period, while the acid/iron solution is under the inert gas atmosphere. Preferably, the defoamer is added about 5 to 30 minutes before the addition of the oxidizing agent. The oxidizing agent is allowed to react with the iron solution for about 20 hours to about 30 hours, or until the solution has a dark red color or deep red-brown color. After the solution reaches a steady red-orange color and a precipitate forms, the oxygen flow is stopped and the precipitate can then be filtered, washed, and promoted by methods known in the art. Unreacted iron can be detected by X-ray diffraction patterns.

The following examples illustrate and explain the present invention, but are not to be taken as limiting the present invention in any regard.

Example 1

A sample of high surface area ferrihydrite is prepared by the inventive process presented herein as follows: A stainless steel gas sparger is fitted into the bottom of a 1 liter jacketed vessel and the temperature is adjusted to hold at about 30° C. About 400 mL of deionized water is added to the vessel and agitation is started at a mix rate of about 1000 RPM. About 53.3 g of an iron powder blend (80/20 blend of Ancorsteel 1000 and ATW-432, both commercially available from Hoeganaes, and each having an iron metal surface area of about 0.2 m$^2$/g) is added to the water with mixing. The iron powder is added slowly enough to maintain a reaction temperature of less than about 30° C. A nitrogen purge is started at a rate of about 35 liters per hour. About 115.2 g of glacial acetic acid (commercially available from Fisher Chemicals) is added to the iron and water mixture with a continuing nitrogen purge. The jacketed vessel temperature is maintained at about 30° C. and the nitrogen purge is maintained for about twenty hours, during which time the iron is digested. About 125 ppm of Foam Blast® 327 (commercially available from Lubrizol) is added to the slurry and the nitrogen is then replaced by a pure oxygen gas flow at a rate of about 50 liters per hour, and the oxygen flow is maintained for about 24 hours while holding the jacketed vessel temperature at about 30° C. The oxygen flow is then stopped and the jacketed vessel temperature is raised to about 60° C., and this temperature is maintained from about one (1) to six (6) hours, or until a very thick red-brown gel precipitates. The iron material slurry is then filtered over no. 42 filter paper. The filter cake is then reslurried with about 1000 mL of deionized water and the mixture is filtered a second time. The filter cake is then dried for about 16 hours at about 120° C. Based on XRD spectral analysis, the material comprises amorphous ferrihydrite. The single point surface area (out-gassed at 150° C. for about 1.5 hours) is about 3.00 m$^2$/g.

Example 2

A sample of high surface area iron oxide with low crystallinity is prepared by the inventive process presented herein as follows: A stainless steel gas sparger is fitted into the bottom of a 1 liter jacketed vessel and the temperature is adjusted to hold at about 30° C. About 500 mL of deionized water is added to the vessel and agitation is started at a mix rate of about 1000 RPM. About 66.6 g of an iron powder blend (80/20 blend of Ancorsteel 1000 and ATW-432, both commercially available from Hoeganaes, and each having an iron metal surface area of about 0.2 m$^2$/g) is added to the water with mixing. The iron powder is added slowly enough to maintain a reaction temperature of less than about 30° C. A nitrogen purge is started at a rate of about 35 liters per hour. About 36.0 g of glacial acetic acid (commercially available from Fisher Chemicals) is added to the iron and water mixture with a continuing nitrogen purge. The jacketed vessel temperature is maintained at about 30° C. and the nitrogen purge is maintained for about four (4) hours with a nitrogen gas flow at a rate of about 36 liters per hour. About 125 ppm of Foam Blast® 327 (commercially available from Lubrizol Corp.) is then added while maintaining the nitrogen flow. About five (5) minutes after the addition of the Foam Blast®, the nitrogen is replaced by a pure oxygen gas flow at a rate of about 50 liters per hour, and the oxygen flow is maintained for about twenty (20) hours while holding the jacketed vessel temperature at about 30° C. The iron material slurry is then filtered over no. 42 filter paper. The filter cake is then reslurried with about 1000 mL of deionized water and the mixture is filtered a second time. Based on XRD spectral analysis, the material comprises poorly crystalline ferrihydrite and/or poorly crystalline goethite and/or poorly crystalline lepidocrocite. The filter cake is then dried for about 16 hours at about 120° C. The single point surface area (out-gassed at 150° C. for about 1.5 hours) is about 300 m$^2$/g The iron material of the present invention is intended for use in any catalyst requiring a high surface area iron oxide. The process by which the material is prepared produces a finished product that comprises predominantly low crystalline iron oxides such as ferrihydrite, goethite and lepidocrocite, and that is essentially free from contaminants, and that has a relatively small particle size distribution range, and a high surface area. It is understood that the specific processing conditions may be varied without exceeding the scope of this development.

We therefore claim:

1. A process for making a high purity iron material, wherein an iron metal is combined with an aqueous organic acid solution and an oxidative agent is forced through said acid solution until essentially all of said iron metal is consumed and an iron material slurry is formed and said iron material slurry is then milled, the improvement comprising:

combining said iron metal and said aqueous organic acid solution in a vessel while maintaining an inert gas purge and while maintaining agitation, said iron metal being added to water in said vessel and said inert gas purge and agitation being initiated before the introduction of said aqueous organic acid solution;

allowing said iron metal and said organic acid to react for a predetermined period of time while said iron metal is digested and said iron material slurry is formed;

stopping said inert gas purge and forcing said oxidizing agent into said vessel, and then stopping addition of said oxidizing agent and increasing the temperature of the vessel until a gel precipitates; and filtering said gel precipitate and retaining a filter cake comprising predominantly ferrihydrite and having a surface area of at least 200 m$^2$/g.

2. The process of claim 1 wherein said iron metal is selected from the group consisting of powder, granule, sphere, chip, shard, needle, iron metal of other configurations, and combinations thereof.

3. The process of claim 1 wherein said oxidizing agent is delivered to said acid solution via a hollow shaft mixer in which said oxidizing agent flows through a shaft and is discharged underneath an impeller.

4. The process of claim 3 wherein said oxidizing agent is delivered to said acid solution via a dip tube extending through the reaction slurry to a discharge point below the impeller.

5. The process of claim 1 wherein said organic acid comprises a carboxylic acid having at least one carboxylic acid group with a pK$_a$ at ambient temperature of about 0.5 to about 6.

6. The process of claim 1 wherein said oxidizing agent comprises oxygen.

7. The process of claim 1 wherein said predetermined period of time until said iron metal is digested is a period of about 1 hour to about 24 hours.

8. The process of claim 1 wherein said filter cake comprise predominantly ferrihydrite having a surface area of at least 200 m$^2$/g and is produced by filtering said gel precipitate and retaining a first filter cake, and then adding said first filter cake to water to form a second iron material slurry, and then filtering said second iron material slurry and retaining a second filter cake, and then air drying said second filter cake to produce the iron material.

9. A process for making a high surface area iron material, said method comprising:

a) adding water to a temperature-controlled reaction vessel heated to a temperature of about 0° C. to about 50° C., fitted with a condenser and chiller, and having a means for agitating the contents of the vessel;

b) while maintaining the temperature of the vessel at about 0° C. to about 50° C., adding iron metal to said vessel with agitation;

c) while maintaining the temperature of the vessel at about 0° C. to about 50° C., purging said vessel with an inert gas while maintaining agitation;

d) while maintaining the temperature of the vessel at about 0° C. to about 50° C., forming an organic acid/iron combination by adding an aqueous organic acid to said vessel with continued agitation and while maintaining the inert atmosphere;

e) adding a defoamer to said organic acid/iron combination while maintaining the inert atmosphere and while holding the temperature of the vessel at about 0° C. to about 50° C.;

f) while maintaining the temperature of the vessel at about 0° C. to about 50° C., agitating said organic acid/iron combination for about 18 hours to about 24 hours under the inert atmosphere until essentially all of said iron metal is consumed and an iron material slurry is formed;

g) while maintaining the temperature of the vessel at about 0° C. to about 50° C., stopping said inert gas purge and forcing an oxidizing agent through said acid solution until said iron metal is consumed and an iron material slurry is formed;

h) stopping said oxidizing agent addition and increasing the temperature of the vessel from a temperature of about 30° C. to a temperature of about 55° C. to about 70° C., and agitating said acid solution for a time period of about 45 minutes to about 6 hours, until a gel precipitate forms;

i) filtering said iron material slurry and retaining a first filter cake; and j) air drying said filter cake to produce a high surface area iron material comprising predominantly ferrihydrite.

10. The process of claim 9 wherein the vessel is held at a temperature of about 30° C. fitted with a condenser held at about 5° C. from step a) through step f).

11. The process of claim 9 wherein said iron metal is selected the group consisting of powder, granule, sphere, chip, shard, needle, iron metal of other configurations, and combinations thereof.

12. The process of claim 11 wherein said iron metal has an average diameter of about 1 μm to about 500 μm.

13. The process of claim 9 wherein said oxidizing agent is delivered to said acid solution via a hollow shaft mixer in which said oxidizing agent flows through a shaft and is discharged underneath an impeller.

14. The process of claim 13 wherein said oxidizing agent is delivered to said acid solution via a dip tube extending through the reaction slurry to a point below the impeller.

15. The process of claim 9 wherein said means for agitating the contents of the vessel are multiple impellers for gas dispersion and solid mixing.

16. The process of claim 15 wherein said multiple impellers comprise a radial flow impeller and an axial flow impeller.

17. The process of claim 9 wherein said inert gas comprises nitrogen.

18. The process of claim 9 wherein said organic acid comprises a carboxylic acid having at least one carboxylic acid group with a $pK_a$ at ambient temperature of about 0.5 to about 6.

19. The process of claim 9 wherein said organic acid is selected from the group consisting of formic acid, acetic acid, glycolic acid, oxalic acid, pyruvic acid, malonic acid and propionic acid, and combinations thereof.

20. The process of claim 9 wherein said organic acid comprises glacial acetic acid.

21. The process of claim 9 wherein the mole ratio of acid to iron ranges from 0.1 acid:1 iron to 2.5 acid:1 iron.

22. The process of claim 9 wherein said oxidizing agent comprises oxygen.

23. The process of claim 9 wherein the steps:
adding said first filter cake to water to form a second iron material slurry; and
filtering said second iron material slurry and retaining a second filter cake;
occur after retaining the first filter cake in step i).

24. A process for making a high surface area iron material, said process comprising:

a) adding water to a temperature-controlled reaction vessel fitted with a condenser and chiller, and having a means for agitating the contents of the vessel;

b) adding iron metal having an average diameter of about 1 μm to about 500 μm and a surface area of less than 25 $m^2/g$ to said vessel with agitation;

c) purging said vessel with an inert gas while maintaining agitation and while holding the temperature of the reactor at about 20° C. to about 50° C.;

d) forming an organic acid/iron combination by adding a carboxylic acid having at least one carboxylic acid group with a $pK_a$ of about 0.5 to about 6 to said vessel with continued agitation and while maintaining the inert atmosphere and while holding the temperature of the rector vessel at about 20° C. to about 50° C.;

e) agitating said organic acid/iron combination for about 3 hours to about 10 hours under the inert atmosphere and while holding the temperature of the vessel at about 20° C. to about 50° C.;

f) adding a defoamer to said organic acid/iron combination while maintaining the inert atmosphere and while holding the temperature of the vessel at about 20° C. to about 50° C., and allowing said defoamer-inclusive solution to mix for about 5 to 30 minutes;

g) stopping said inert gas purge and forcing an oxidizing agent through said acid solution while holding the temperature of the vessel at about 20° C. to about 50° C. for a time period of greater than about 20 hours until a gel precipitate forms, wherein said oxidizing agent is delivered to said acid solution via a means by which said oxidizing agent is discharged underneath an impeller;

h) filtering said gel precipitate and retaining a first filter cake; and i) air drying said filter cake to produce a high surface area iron material comprising predominantly low crystalline iron oxides having a surface area of at least 200 $m^2/g$.

25. The process of claim 24 wherein
said organic acid is selected from the group consisting of formic acid, acetic acid, glycolic acid, oxalic acid, pyruvic acid, malonic acid and propionic acid, and combinations thereof.

26. The process of claim 24 wherein said oxidizing agent comprises oxygen.

27. The process of claim 24 wherein said defoaming agent is silicone-free, mineral oil-free and petroleum-free.

28. The process of claim 24 wherein said oxidizing agent is delivered to said acid solution via a hollow shaft mixer in which oxygen flows through a shaft and is discharged underneath an impeller.

29. The process of claim 28 wherein said oxidizing agent is delivered to said acid solution via a dip tube extending through the reaction slurry to a point below the impeller.

30. The process of claim 24 wherein the steps:
adding said first filter cake to water to a second iron material slurry; and
filtering said second iron material slurry and retaining a second filter cake;
occur after retaining the first filter cake in step h).

* * * * *